W. F. BRIGHT.
TIRE HOLDER.
APPLICATION FILED SEPT. 23, 1910.
988,305.
Patented Apr. 4, 1911.
2 SHEETS—SHEET 1.
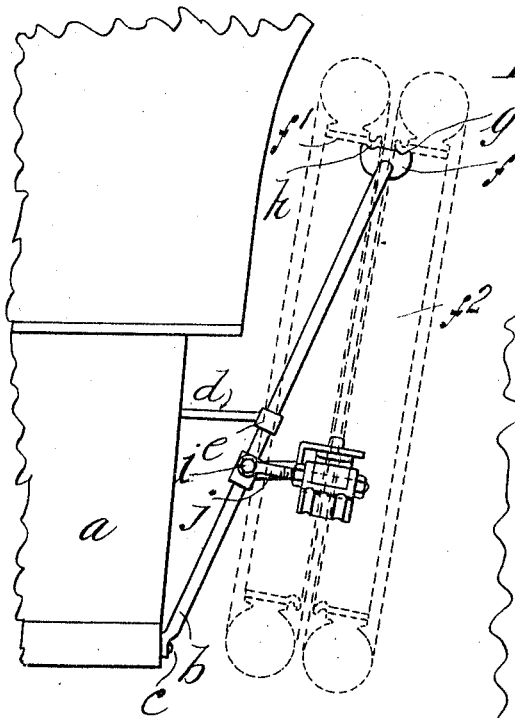
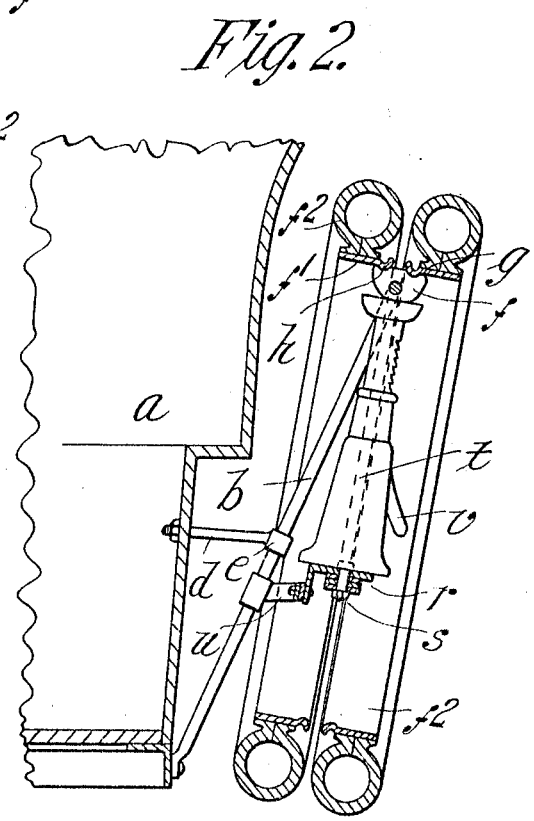
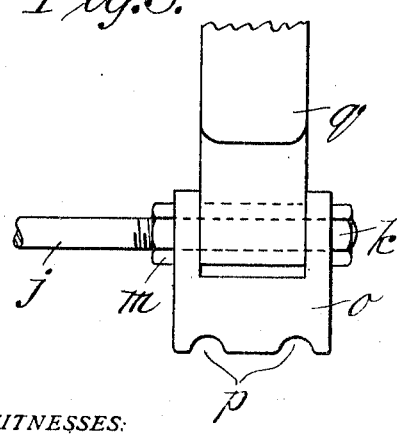
WITNESSES:
INVENTOR.
Weston F. Bright.
BY Chapin
ATTORNEY.

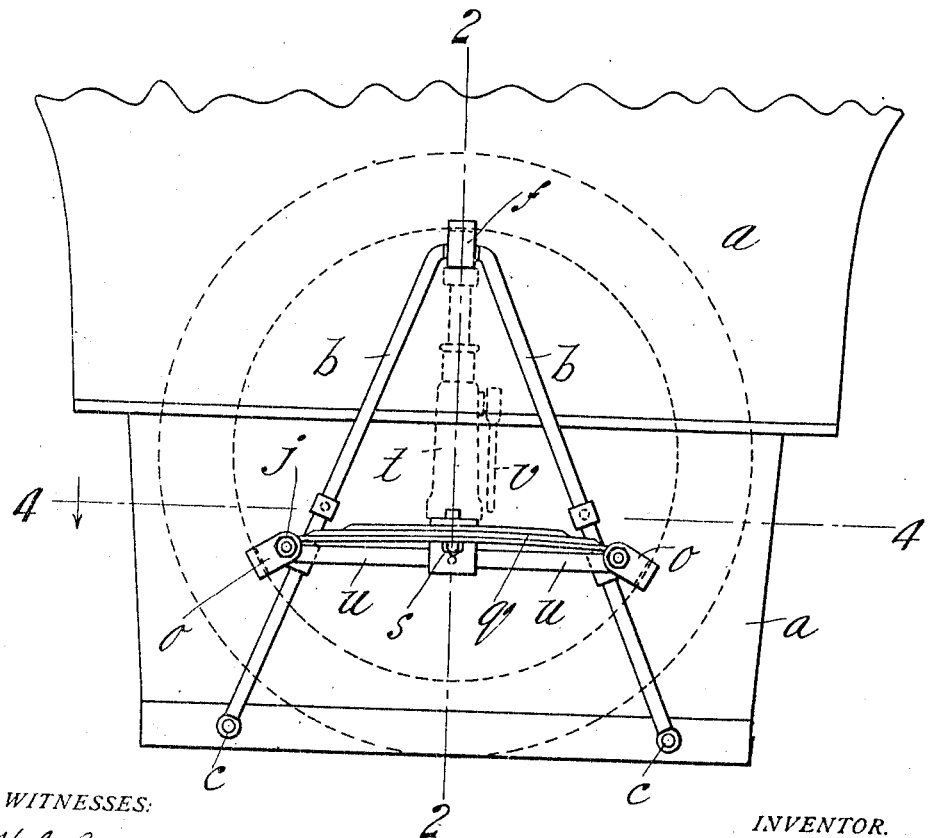

UNITED STATES PATENT OFFICE.

WESTON F. BRIGHT, OF SPRINGFIELD, MASSACHUSETTS.

TIRE-HOLDER.

988,305.  Specification of Letters Patent.  Patented Apr. 4, 1911.

Application filed September 23, 1910. Serial No. 583,339.

*To all whom it may concern:*

Be it known that I, WESTON F. BRIGHT, a citizen of the United States of America, residing at Springfield, in the county of Hampden and State of Massachusetts, have invented new and useful Improvements in Tire-Holders, of which the following is a specification.

This invention relates to improvements in tire-holders for use on automobiles for carrying extra tires in an inflated condition so that when an inflated tire is to be applied to a wheel it is only necessary to remove the deflated tire and place the inflated one thereon.

The invention consists in general in securing to the body portion of the vehicle, (and preferably at the rear portion thereof), a framework which is substantially triangular in shape, the apex of the triangle being provided with a plate or saddle for supporting and carrying the weight of the tires and the demountable rim, the base of the triangle being connected by a spring element serving as a platform for receiving any suitable means for retaining the tires on the frame; and the means that I have adopted for this purpose is a lifting-jack of the ratchet type which is also convenient for elevating the axle of the vehicle when a change of tires is made.

In the drawings forming part of this application,—Figure 1 is a side elevation of the rear portion of the vehicle body showing the edge of the frame and the tire supported thereon illustrated in dotted lines. Fig. 2 is a vertical, sectional view of Fig. 1 taken lengthwise of the body and at one side of the apex of the supporting frame, showing the jack in place for retaining the tire against accidental removal from the frame. Fig. 3 is an enlarged detail view of one of the supporting rods with a block thereon which engages the inner edge of the demountable rim, and also showing a portion of the spring-support. Fig. 4 is a sectional, plan view of the platform of the spring support, illustrating the manner of attaching the support to the rods which extend to the lower part of the frame, the section being taken on line 4—4, of Fig. 5. Fig. 5 is an end view of the device, clearly illustrating the jack interposed between the apex of the frame and the spring support.

Referring to the drawings in detail, $a$ designates the rear portion of the vehicle body; $b$ the triangular-shaped frame that is secured to the lower part of the vehicle body at the points $c$ and which extends upward and outward in an inclined position. It is supported midway of its length by the stay-rods $d$ which are connected with the frame $b$ at the point $e$. The apex or upper part of this triangular frame carries a supporting plate or saddle $f$ of any suitable design for receiving the demountable rim of any particular make in common use, and the plate illustrated is provided with two notches or recesses $g$ that receive the beaded edge portion of the demountable rim, as illustrated at $h$. The demountable rim is designated at $f^1$ and its tire at $f^2$.

Pivotally connected to the frame $b$ by means of the pins or bolts $i$ are rods $j$ which extend in a horizontal direction rearwardly from the body portion of the vehicle, the outer ends of which are threaded for receiving nuts $k$ and $m$. Between these nuts on the rods $j$ are clamped the blocks $o$ having recesses or grooves in their lower edges, as shown at $p$. Extending between the rods $j$ on opposite sides of the frame $b$ are a series of springs of leaf form, as shown at $q$, which are attached to said rods, and inside of the blocks $o$, as clearly shown in Fig. 3.

Located on the uppermost leaf of the springs and intermediate of their length is a plate or platform $r$ that is secured to the springs by means of the bolt $s$, and serves as a base or support for the lifting jack, as shown at $t$.

$u$ designates a pair of brace-rods that extend laterally from the plate $r$ to the rods $j$, and their outer ends are bent at an angle so as to receive the pivot-pin or bolt, whereby the rods are secured to the frame $b$.

From this construction it will be seen that the spring $q$ can swing upward and downward with relation to the frame $b$ by reason of the pivotal connection at $i$; but can not swing laterally since the frame $b$ is pivoted at the point $c$, and the bars $u$ serve as braces between the springs $q$ and the frame $b$.

It will be noticed that the springs $q$ are in a plane that is substantially horizontal, but when the jack is inserted in the frame $b$ these springs are capable of being bent below the horizontal plane if desired, when the jack $t$ is operated.

Referring now to the manner in which my tire support is used: The tires, with their demountable rims, are shown in dotted lines in Figs. 1 and 2. The bead portion h of the rim is inserted in the grooves g of the plate or saddle f and also in the grooves p of the blocks o. The jack t is then inserted within the frame a and the handle v operated so that the springs q are bent downward at the same time the rods j turn downward on their pivots i clamping or gripping the rims to the plate f and the blocks o so that it can not jar out or become loose when the vehicle is traveling on the highway.

In order to effect the removal of the demountable rims and their tires from the members f and o, it is only necessary to loosen the tension of the springs q and remove the jack when the rim can be lifted from the supporting plate, f, it being understood that the rods j therein swing upward on the pins i so that the blocks o are disengaged from the beaded portion h of the rims.

It should be stated that I do not limit myself to the particular form of plate f and blocks o, as there are other forms that may be substituted for receiving demountable rims of any particular make in use which are well known on the market.

It should also be understood that I do not limit myself to the particular use of the triangular frame b as the plate or saddle f and the blocks o may be attached directly to the vehicle body a by rods directly attached thereto.

What I claim, is:—

1. In a tire-holder, the combination with a suitable support, a frame element attached to said support, the upper portion of the frame being provided with a plate for supporting the weight of a tire-rim, and the lower portion of the frame having means secured thereto for receiving the rim, and means interposed between said tire-receiving means and the plate for clamping the rim in place and against displacement.

2. In a tire support comprising a frame element, the upper portion of the frame having a plate of suitable form secured thereto and on which the demountable rims are supported or hung, the lower part of the frame being connected to a suitable support, said part of the frame having a platform connected thereto for receiving a clamping element, a pair of blocks supported by the lower part of the frame for receiving the inner edge of the demountable rim, the clamping element extending from the platform to the plate.

3. In a tire-holding device, the combination with a frame suitably secured to a suitable support, a platform construction pivotally connected to the frame so as to swing in a vertical plane but held against lateral movement, the upper portion of the frame having a supporting plate and the lower portion members with which the inner edge of the demountable rim engages, and means extending between the upper portion of the frame and the platform for clamping the rim to the frame.

4. A supporting device for the rims of pneumatic tires comprising a triangular-shaped frame adapted to be secured to a suitable support, a plate for receiving the weight of the rim and mounted at the apex portion of said frame, a frame pivotally connected to the triangular-shaped frame, blocks carried thereby for receiving the inner edge of the rim, and an extensible device located between the plate and the pivotal frame for clamping the rim to the frames as described.

WESTON F. BRIGHT.

Witnesses:
K. I. CLEMONS,
HARRY W. BOWEN.